United States Patent [19]

Früngel et al.

[11] 4,259,592
[45] Mar. 31, 1981

[54] CEILOMETRIC METHOD AND APPARATUS

[75] Inventors: Frank Früngel, im Glockenacker 2, 8053 Zürich, Switzerland; Martin Spies, Pfaffenhofen, Fed. Rep. of Germany

[73] Assignee: Frank Früngel, Zürich, Switzerland

[21] Appl. No.: 61,991

[22] Filed: Jul. 30, 1979

[30] Foreign Application Priority Data

Aug. 3, 1978 [CH] Switzerland .......................... 272/78

[51] Int. Cl.³ .......................................... G01N 15/06
[52] U.S. Cl. ......................................... 250/574; 356/5
[58] Field of Search ............... 250/573, 574, 575, 564, 250/565; 356/5, 342

[56] References Cited

U.S. PATENT DOCUMENTS 3,499,159  3/1970  Carrier et al. .......................... 250/574

3,856,402  12/1974  Low et al. .......................... 356/5

Primary Examiner—David C. Nelms
Attorney, Agent, or Firm—Michael J. Striker

[57] ABSTRACT

In a ceilometric system, light pulses are emitted from a transmitter towards overhead clouds and reflected back down towards a receiver which generates a photodetector signal transmitted by a gate whose gating interval is shifted in time relative to the light-pulse emission instant to define successive range steps. During each dwell at a particular gating interval and range step, the photodetector signal is integrated to develop an integral signal for that range step. The integral signal for each range step is digitalized and stored in a digital storage circuit, ordered in correspondence to the sequence of the range steps. A microprocessor searches for the largest one of the stored integral signals and derives a ceilometric indication in dependence thereon.

25 Claims, 2 Drawing Figures

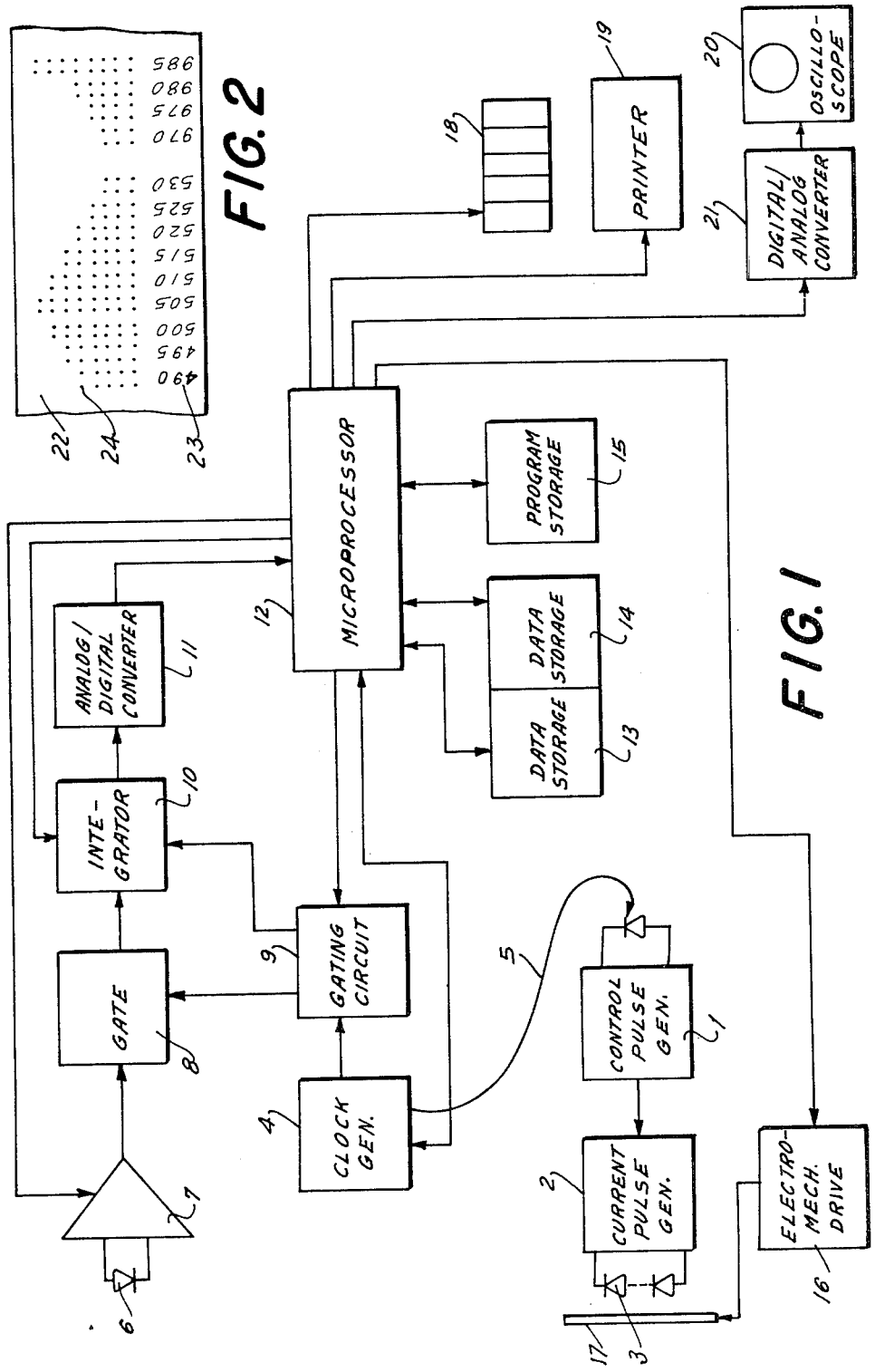

CEILOMETRIC METHOD AND APPARATUS

BACKGROUND OF THE INVENTION

The present invention concerns ceilometric methods and apparatuses of the type in which a transmitter emits a pulsed beam of light, and the pulsed beam directed upwards and reflected back down from one or more overhead cloud layers is downwardly incident upon a photodetector. Transmission of the photodetector output signal is gated in accordance with range-gating technique. The start and end of the gating interval, measured relative to the time of emission of a light pulse from the transmitter, is correlated with the round-trip travel time for the emitted radiation from the transmitter to an overhead cloud, if any, located at a predetermined ceilometric range step. The time of occurrence of the gating interval, relative to the pulse emission instant, is stepwise shifted, so as to establish a succession of range steps each associated with a respective potential cloud elevation. Before going on from one range step to the next, the time interval spent at one range step, i.e., using one particular gating interval, is equal to a multiple of the period of the emitted light pulses, so that a plurality of light integrations be performed at each range step before proceeding onto the next one.

Such methods and apparatuses are known, for example, from Federal Republic of Germany published allowed patent application (Auslegeschrift) No. 2,150,969. The integrated photodetector signal developed during the repeated light measurements performed during the dwell at each individual range step is recorded by means of a pen recorder instrument. The drive mechanism for the pen of the recorder is coupled with a potentiometer which is repeatedly adjusted for effecting the successive shifts with respect to emission time of the time of occurrence of the gating interval, so as to effect the runthrough through the succession of range steps.

The operation of the recording system, being dependent upon the shifting with respect to time of the time of occurrence of the gating interval, necessitates the use of a relatively costly and somewhat malfunction-prone mechanism. Furthermore, because of the type of recording technique employed, the time required to record, as opposed to that required to perform, one complete runthrough through the whole succession of range steps is relatively lengthy. Problems therefore arise when such recording technique is to be used in conjunction with flight-safety ceilometers which, in accordance with international aviation regulations, must repeat a runthrough through the entire ceilometric range explored at least once every 15 seconds.

SUMMARY OF THE INVENTION

It is a general object of the invention to provide faster, more reliable and more exact techniques for effecting display and/or registration of the ceilometric signals generated in such a system and method.

In accordance with the present invention, the integrated photodetector signal developed during the dwell at each successive individual range step is converted from analog to digital form and registered in a digital storage. The integrated photodetector signals for successive range steps are registered in the digital storage ordered in sequence corresponding to the sequence of range steps itself, by corresponding ordering of the storage location addresses employed for the successive photodetector integral values or by associating with each stored range-step signal an auxiliary datum indicating the associated position in the sequence of range steps involved. The actual ceilometric or cloud-height value to be indicated is then ascertained by automatic reference to the range step values for the largest photodetector integral values thusly stored.

In accordance with a further concept of the invention, before the start of each range-step runthrough, or once per every several range-step runthroughs, the emitted pulsed-light beam is discontinued, e.g., using a shutter moved into the emitted-light path, and a range-step runthrough is then performed with the photodetector employed exposed only to ambient light. The photodetector integral signals generated for each successive range step are, as for normal operation, digitalized and stored in the digital storage ordered in correspondence to the sequence of range steps involved. For example, the integral values generated during the ambient-light runthrough may be stored in a second digital storage, or in a different storage sector of the digital storage employed for the normal-operation runthroughs. After the ambient-light runthrough is performed, during the subsequent pulsed-light runthrough, the photodetector integral signal developed for each range step has subtracted from it the ambient-light integral signal developed during the corresponding range step of the ambient-light runthrough, and then all the resultant difference values are stored, ordered in accordance with the successive range steps of the runthrough. This helps, inter alia, to suppress the effect of electrical interference pulses which occur at a frequency equal to the pulsed-light transmitter frequency. This makes it possible to avoid use of the rather costly shielding hitherto employed for all those circuit components of the equipment responsible for the generation of these interference pulses.

In accordance with a further concept of the invention, the average of the stored integral values accumulated during a normal-operation runthrough is automatically ascertained and used to control the gain of the amplifier which amplifies the photodetector output signal, or the equivalent, for example varying the amplifier gain in inverse proportion or more generally inverse relationship to such automatically ascertained average value. This automatically adjusts the sensitivity of the photodetector-signal processing circuitry employed in correspondence to the prevailing metereological or ambient-light conditions, so that the receiver circuitry not be overloaded by extremely high values of incident light such as might result from direct strong sunlight or from a low-lying highly reflective cloud.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic block diagram of an apparatus used for ceilometric measurement according to the invention; and FIG. 2 depicts a small section of a print-out provided by the printer of the apparatus of FIG. 1.

DESCRIPTION OF THE PREFERRED EMBODIMENTS

The transmitter of the equipment depicted in FIG. 1 comprises a control pulse generator 1 which controls a current pulse generator 2 opeative for pulsewise energizing a GaAs-Ga$_x$Al$_{1-x}$As laser-diode array 3. The transmitter optics employed are, for the sake of simplicity, not depicted inasmuch as conventional and familiar. The peak power of the laser light pulses emitted by the laser-diode array 3 amounts to, for example, 70 W and the pulse duration employed to 200 nanoseconds. Control pulse generator 1 is periodically activated by an electrooptically coupled clock generator 4. Clock generator 4 generates clock pulses which energize an internal light source, whose pulsed light is transmitted via a light conductor 5 to the illustrated photodiode of control pulse generator 1. The clocking frequency is, for example, 1 kHz.

The receiver section of the equipment comprises the usual (non-illustrated) receiver optics (e.g., of cassegrainian-telescope configuration) provided with an interference filter transmissive for the laser wavelength employed, as well as a photodetector 6 comprised of a silicon avalanche diode and a controllable-gain amplifier 7 whose output is connected to the input of a gate 8. The output of gate 8 is connected to the signal input of an integrator 10. The control input of gate 8 is connected to the output of a gating circuit 9 which receives the clock pulses from clock generator 4. The output of integrator 10 is connected through the intermediary of an analog-to-digital converter 11 to the data input of a microprocessor 12 (CPU (6100). Here, by way of example, microprocessor 12 is provided with a first digital data storage 13 and a second such storage 14, as well as a program storage 15. The microprocessor 12 may be of rather simple configuration, operative for performing simple subtractions, for ascertaining the average of a set of stored values, and operative for performing comparisons. Additionally, microprocessor 12 furnishes a control pulse for an electromechanical drive mechanism 16 operative for opening and closing a shutter 17 located in the path of light emitted from the laser-diode array 3, so as to either permit pulsed light emission or block such emission.

Connected to the outputs of microprocessor 12 are three read-out units, i.e., a digital display 18, a printer 19 and an oscilloscope 20 connected to the output of microprocessor 12 through the intermediary of a digital-to-analog converter 21.

In operation, a complete range-step runthrough is performed every 15 seconds. It is assumed, for explanation, that 256 successive range steps are involved in the operative range of the system.

Every one hundred runthroughs or so through the 256 successive range steps, microprocessor 12 issues a command that drive unit 16 close shutter 17, which unit 16 now does in order to block emission of pulsed measuring light in preparation for performance of an interference-pulse compensation. A complete runthrough is then performed, in the manner described below for normal ceilometric operation. During the dwell at each individual range step, the photodetector signal integral value developed is registered in a location within second digital data storage 14 ordered in accordance with the sequence of range steps themselves. When 256 such integral values are thusly accumulated, microprocessor 12 issues a command that drive unit 16 reopen shutter 17 in preparation for normal operation. The photodetector integral signals developed during this compensation runthrough will depend upon ambient-light intensity to some extent. Additionally, and to a greater extent, the integral signals developed may be highly dependent upon and very much contributed to by interference pulses generated by various transmitter circuit components during this range-step runthrough. Because the light-emitting circuit of the transmitter is entirely operative during this compensation runthrough, and the pulsed light beam generated merely blocked by shutter 16, the interference pulses produced by the light-emitting circuitry, these interference pulses occuring with a frequency equal to or related to the repetition frequency of the emitted pulses, are allowed to contribute to the integral signals developed for the individual range steps, without any contribution from the reflected-back light employed during normal operation. Accordingly, the integral signals developed will per se indicate the contribution, at each range step, of such interference pulses to the integral signals later developed during normal ceilometric operation. Using this technique, it becomes possible to avoid the costly shielding with which such interference pulse-generating components of the transmitter circuitry would normally be provided in prior art.

During normal ceilometric operation, and as indicated earlier during the compensation runthrough also, each range step is defined by the establishment of a gating interval whose time of occurrence lags the time of emission of a laser pulse by an interval corresponding to the round-trip light travel time for the ceilometric range step involved. Each clock pulse generated by clock generator 4 is optically transmitted to control pulse generator 1 and results in the emission of one laser-light pulse. Each clock pulse is additionally applied to microprocessor 12 which keeps a running count of such clock pulses, in order to keep a running count of the number of light-pulse emissions performed and in order to be informed of the time of occurrence of each such pulse emission. A predetermined number of pulse emissions is allotted to each individual range step, so that such number of pulse integrations be performed to develop the photodetector integral signal associated with one range step. The frequency of the clock pulses transmitted by clock pulse generator 4 to microprocessor 12 is advantageously a high multiple of the frequency of the clock pulses applied to control pulse generator 1 and gating stage 9, i.e., a high multiple of the repetition frequency of emitted light pulses. Microprocessor 12 counts these clock pulses, and when a number of these corresponding to the lower limit of the range-step involved has been counted, issues a signal to gating stage 9 in response to which the latter enables gate 8. When microprocessor 12 has counted a number of further clock pulses corresponding to the difference between the lower and upper limits of the range-step involved, it transmits to gating stage 9 a signal causing the latter to again disable gate 8. Microprocessor 12 repeats its operation a predetermined number of times before proceeding on to the next range step. For the second such range step, however, the number of clock pulses counted by microprocessor 12 prior to causing gating circuit 19 to enable gate 18 is now different, in correspondence to the lower limit of such second range step. The duration of the gating interval may, for example, amount to 66.6 nanoseconds, in correspondence to a distance accuracy of ±5 meters. The number of pulse emissions for which the microprocessor 12 dwells at one range step before proceeding on to the next one is to a multiple of the period of the emitted laser pulses. Preferably, the first range stp is at the upper end of the system's operative range, and the subsequent and successive range steps are lower and lower. The amounts by which the gating intervals of immediately successive range steps respectively lag the instant of light pulse emission preferably differ from each other by a time interval smaller than the period of the repetitively emitted light pulses. At the end of the plural integrations performed for each individual range step, microprocessor 12 applies to integrator 10 a readout signal causing the thusly developed integral signal to be applied to analog-to-digital converter 11 and be registered, in digital form, and thereafter issues a signal causing integrator 10 to be reset in preparation for the next range step.

As each range-step integral signal, as a digital value, is received by microprocessor 12, microprocessor 12 subtracts from that value the digital value stored in that location within second digital storage 14 which corresponds to the range step involved, i.e. subtracts the stored digital value developed during the initial compensation runthrough during which the shutter 17 blocked the emission of laser pulses. The resultant difference value is then stored in first digital storage 13, at an address location ordered in correspondence to the succession of range steps.

Upon the completion of one such normal-operation runthrough, first digital data storage circuit 13 will have accumulated 256 such difference values, one for each range step involved. Before proceeding on to the next runthrough, microprocessor 12 searches through the 256 difference values stored in digital storage circuit 13, searching for the largest one of such stored difference values. The address numbers of the stored difference values are directly correlated with successive range-step values, and microprocessor 12 produces a signal identifying the range-step value (e.g., 1000 feet) associated with the largest stored difference value, this signal being applied to digital display 18 for direct numerical display of the height of the most reflective cloud layer encountered.

Additionally, microprocessor 12 forms the average of the 256 stored difference value and furnishes a corresponding signal to the gain-control input of controllable-gain amplifier 7, varying the gain of the latter in inverse relationship, e.g., inversely proportional, to such average value.

Inasmuch as digital display 18 merely provides a direct numerical read-out of the elevation of the most reflective cloud layer encountered, it may for, e.g., metereological purposes be desired to provide information more comprehensively descriptive of the overhead cloud situation encountered. Accordingly, a command signal may be manually applied to microprocessor 12, or be automatically applied thereto at predetermined intervals, to cause the latter to transmit stored difference values concerning one range-step runthrough to the printer 19. In principle, it would be possible for microprocessor 12 to transmit all 256 difference values pertaining to one runthrough to printer 19 for print-out by the latter. However, if, as assumed, the runthrough is to be repeated at intervals of 15 seconds, there may be insufficient time for printer 19 to print out 256 such values before the next runthrough is to commence, unless very considerable cost were permitted for printer 19. Conversely, if a cheap and slow-printing printer 19 were used, it would be possible to transmit to the printer the 256 difference values pertaining to one runthrough at a much slower rate, e.g., over a time interval lasting for more than one or several runthroughs. This, however, would mean tnhat print-outs could not be furnished as often as the runthroughs are actually performed, also, some form of buffer storage would be necessary for temporary storage of the 256 difference values accumulated in first digital storage 13, inasmuch as the difference values stored in the latter will be replaced during the course of the next-following runthrough.

Therefore, according to a further feature of the invention, before transmitting difference-value data to printer 19, microprocessor 12 compares each of the 256 difference values pertaining to one runthrough against a predetermined value, to ascertain which difference values exceed the predetermined value. The predetermined value may be a prefixed value, or it may be a value selected by microprocessor 12 upon completion of each runthrough, selected in dependence upon the ascertained average value multiplied by a predetermined proportionality factor. Those of the difference values which exceed the prefixed or average-dependent value are then normalized and transmitted to printer 19, along with signals indicating the range-step value for each such difference value, for print-out in accordance with a scheme described below. The print-out scheme, as shown in FIG. 2 with respect to a limited section of the print-out 22, may be similar to a histogram. As indicated at 23 in FIG. 2, only those range-step numbers are printed out whose associated difference values exceed the predetermined values mentioned above. Printed out alongside each range-step value, is, by way of example, a series of dots 24. The number of dots printed alongside the respective range-step value may be proportional to the associated difference value or may be proportional to the amount by which the associated difference value exceeds the predetermined value, so that fewer dots be needed to convey the information of interest. If the number of dots printed as proportional to the associated difference value, then it is advantageous that the difference value be normalized with respect to the largest one of the difference values or with respect to the average of all 256 difference values. Likewise, if the number of dots printed is proportional to the amount by which the difference values which exceed the predetermined value do so, then the number of dots printed is, for example, advantageously normalized with respect to the largest of such amounts. All this serves to reduce the number of dots which need be printed. By proper selection of the aforementioned predetermined value relative to which the difference values are compared, it becomes possible to reduce the amount of data printed out to that just necessary for description of the cloud-cover situation prevailing. This makes it possible to employ an inexpensive and relatively slow-printing printer, and still be able to perform the print-out for one runthrough in the time available between successive runthroughs. As indicated earlier, according to ICAO standards, the runthroughs must be repeated at least once every 15 seconds. Besides this technique permitting the use of a simpler printer, the print-out is actually more informative, in the sense that it dispenses with print-out of considerable amounts of data, i.e., the difference value for each and every one of the 256 range steps involved, not actually contributing to the analyst's quick interpretation of the cloud-cover situation prevailing.

Additionally, the microprocessor 12 furnishes, at the end of each runthrough, all 256 registered difference values, at high speed, to a recording oscilloscope 20, through the intermediary of digital-to-analog converter 21.

It may happen, due to a low signal-to-noise ratio of the photodetector signal being integrated for each individual range step, that the low SNR carries over into the histogram-like print-out in a manner detracting from its clarity or quick interpretability. There are various ways to deal with poor SNR in such a ceilometric apparatus. Indeed, the pulse-integration technique in itself represents one main approach to this problem, in that it results in the build-up of higher-value signals than without pulse integration. Another way to improve the SNR situation, would be to employ range steps of greater magnitude, i.e., each range step corresponding, for example, to a 50-foot range interval instead of a finer 10-foot range interval. With range steps of greater size, a greater difference is developed, as between the integral signals of range steps where cloud bodies are present and those where cloud bodies are not present.

However, the present invention additionally includes a different approach to improvement of the SNR ratio, i.e., to improvement of the effect of a poor SNR ratio upon the print-out to be interpreted, without the actual need to increase the magnitude of each range step. In accordance with this feature of the invention the microprocessor 12, when comparing the difference values stored in storage circuit 13 against the predetermined value, does not compare against the predetermined value each difference value individually, but instead on a groupwise basis. First, the microprocessor forms the average of the first through fifth stored difference values (corresponding to the first through fifth range steps), and compares this average against the predetermined value. Next, the microprocessor forms the average of the second through sixth stored difference values, and repeats the comparison; then the third through seventh stored difference values; and so forth. When the average of one such group of five successive difference values exceeds the predetermined value, then there is printed out the range-value number for the middle one of the five difference values (e.g., the third range value in the case of the group constituted by the first through fifth difference values) together with a number of dots proportional to this average-of-five value or the amount by which such average-of-five value exceeds the predetermined value, normalized with respect to the largest of the 256 difference values or normalized with respect to the average of all 256 difference values or normalized with respect to the amount by which the largest difference value exceeds the predetermined value.

Although such a technique is abstractly similar to actual range-step size increase, there is no actual modification of the duration of the gating interval employed. Nevertheless, and very surprisingly, it has been found that the resultant print-out is usually of improved graphical character and interpretability when low SNR situations are involved.

As well known, the power attenuation suffered by the emitted and reflected-back beam is approximately a quadratic function of beam-travel distance. In order to normalize the magnitude of the integral signals developed for the individual range steps, it is furthermore contemplated according to the invention to progressively decrease the number of pulse integrations allotted per range step with decreasing range step and/or to decrease the size of successively lower range steps themselves, in such a manner that the quadratic power attenuation is compensated and the integral signal developed normalized over the whole operative range of the system. In addition to the advantage of normalization, the use of smaller range steps at lower elevations is very desirable, because it is typically at the lowest elevations that very accurate ceilometric values are most needed.

Instead of using a controllable-gain amplifier 7, use could be made of an adjustable-threshold amplifier, operative in the case of input signals whose amplitudes are in excess of the threshold value for transmitting the full excess but not transmitting input signals whose amplitudes are lower than the threshold value. In that event, instead of microprocessor 12 varying the gain of the controllable-gain amplifier in inverse relationship to the average of all difference values developed during one runthrough, the threshold level of the adjustable-threshold amplifier would be varied in direct relation or in direct proportion to the average of all 256 difference values. When the emitted light pulse power is sufficiently great compared to ambient light, the use of such an adjustable-threshold amplifier has the advantage that the ambient-light component of the photodetector signal being integrated is suppressed and not amplified.

When the photodetector employed is an avalanche diode, then it can be of advantage to vary the voltage applied to such diode, and accordingly its amplification factor, in dependence upon which range step is involved and/or in dependence upon the diffuse absorption of the pulsed-light signal in the ambient atmosphere, it being well known that the gain of an avalanche diode follows the voltage applied to it.

The aforedescribed inventive technique for dealing with poor SNR situations can be pushed somewhat further, especially when longer time intervals are available for a complete range-step runthrough, e.g., in purely metereological applications where, unlike flight-safety applications, a runthrough need not be performed as often as every 15 seconds. In accordance with this further feature, the ceilometric value resulting from each complete runthrough is compared by microprocessor 12 against the ceilometric value resulting from the immediately preceding runthrough, the ceilometric value from the preceding runthrough being held over until completion of such immediately next-following runthrough. This makes possible a limited amount of increase in the upper limit to which the total ceilometric range to be explored can be pushed. Practical tests have yielded an increase of ca. 20–25% in the feasible upper limit of the ceilometric range. Such an increase of the upper range limit can be of importance when the ceilomoetric system is used, for example, at unmanned weather stations, a context of use where considerable time is available for the performance of each complete runthrough.

The features of the present invention can also be used in poor-visibility conditions for ascertainment of the so-called point of view, i.e., the highest point from which a view of the ground below would still be possible for the pilot of an aircraft. For example, if the receiver and transmitter are tilted by 3° or 6° or whatever, it becomes possible to ascertain slant visual range, i.e., the geographical distance that a pilot landing in the direction of this angle would have with respect to the ground surface.

It will be understood that each of the elements described above, or two or more together, may also find a useful application in other types of circuits and constructions differing from the types described above.

While the invention has been illustrated and described as embodied in the context of a particular type of ceilometric system it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A ceilometric method comprising the steps of
   emitting light pulses from a transmitter upwards towards overhead clouds for reflection downwards back onto a receiver comprising a photodetector generating a photodetector signal,
   transmitting the photodetector signal to an integrator during a gating interval, the time between a pulse emission and the start and end of the gating interval establishing the size and the distance from the transmitter and receiver of a ceilometric range step to be explored, and shifting the gating interval in time relative to the time of pulse emission so as to explore successive ceilometric range steps within a predetermined ceilometric range, the time between a pulse emission and the gating interval being maintained constant for a plurality of pulse emissions to allow a build-up of the integrated photodetector signal associated with that range step before proceeding on to the next range step,
   applying the photodetector integral signal developed for each range step to an analog-to-digital converter and writing the digitalized versions of the photodetector integral signals into digital storage circuit means ordered in the digital storage circuit means in correspondence to the sequence of the respective range steps,
   and generating an indication of ceiling using means operative for ascertaining the largest integral signal stored in the digital storage circuit means.

2. The ceilometric method defined in claim 1, furthermore comprising operating the transmitter but optically blocking the emitted light pulses so that these cannot reach the receiver and developing for each range step a respective photodetector integral signal without the receiver receiving any light pulses from the operating but optically blocked transmitter with the just-mentioned integral signal constituting a compensation signal for the respective range step, and then for the integral signals developed in accordance with the recitations of claim 1 subtracting from each the compensation signal associated with the respective range step.

3. The ceilometric method defined in claim 2, the subtracting being performed before the integral signals developed in accordance with the recitations of claim 1 are stored in said digital storage circuit means.

4. The ceilometric method defined in claim 1, the photodetector signal being transmitted to the integrator through the intermediary of an adjustable amplifier, furthermore including the steps of using an average-determining means to ascertain the average of the stored integral signals and applying a signal dependent upon such average to means for automatically adjusting the adjustable amplifier.

5. The ceilometric method defined in claim 4, the adjustable amplifier being an adjustable-gain amplifier, using for the means for automatically adjusting the amplifier gain-control means operative for increasing the amplifier gain with decreasing value of said average and decreasing the amplifier gain with increasing value of said average.

6. The ceilometric method defined in claim 4, the adjustable amplifier being an adjustable-threshold amplifier, using for the means for automatically adjusting the amplifier means for increasing the threshold of the amplifier with increasing value of said average and decreasing the threshold of the amplifier with decreasing value of said average.

7. The ceilometric method defined in claim 1, each time the integral signals for all the range steps have been developed generating a signal indicating the range step with which is associated the largest of the stored integral signals and applying such signal to an indicator for indication of that range step.

8. The ceilometric method defined in claim 1, after the integral signals for all the range steps have been developed, transmitting data concerning the values of those integral signals whose values are in excess of a predetermined value to a printer and causing the printer to print out a tabulation of those range steps whose integral signals are in excess of the predetermined value as well as data concerning the values of those integral signals in excess of the predetermined value.

9. The ceilometric method defined in claim 8, the predetermined value being constant and independent of the values of the integral signals developed.

10. The ceilometric method defined in claim 8, the predetermined value being dependent upon the average of the integral signals developed.

11. The ceilometric method defined in claim 1, furthermore including the step of changing, as a function of range step, at least one of the following two quantities: the length of the gating interval, and the number of pulse integrations performed per range step.

12. The ceilometric method defined in claim 1, using totalizing means to ascertain the sum of successive overlapping groups of immediately successive stored integral signals each, comparing each sum against a predetermined value, and transmitting data concerning each such sum and also data concerning the range steps associated with such sums for each sum which exceeds a predetermined value.

13. The ceilometric method defined in claim 12, the transmitted data being transmitted to a printer operative for printing out an indication of range value for each sum which exceeds the predetermined value and also printing out data concerning the value of each sum which exceeds the predetermined value.

14. In a ceilometer, in combination,
   transmitter means emitting light pulses upwards towards overhead clouds for reflection back downwards and receiver means receiving the reflected back light pulses and including a photodetector producing a photodetector signal;
   gating means for transmitting the photodetector signal during predetermined gating intervals, the time between a pulse emission and the start and end of each gating interval establishing the size and the distance from the transmitter and receiver of a ceilometric range step to be explored, including means shifting the gating interval in time relative to the time of pulse emission so as to explore successive ceilometric range steps within a predetermined ceilometric range;

integrating means receiving the photodetector signal and developing an integral signal for each range step;

an analog-to-digital converter connected to the output of the integrating means; and digital storage circuit means connected to the output of the analog-to-digital converter and operative for storing digitalized versions of the integral signals developed for successive range steps in an order corresponding to the order of the successive range steps.

15. A ceilometer as defined in claim 14, furthermore including optical light-blocking means movable into the path of the emitted light pulses, so that the transmitter may be operated without pulsed light reaching the receiver during the exploration of the succession of range steps in order to generate compensation signals for the range steps, and means for subtracting the compensation signals from the integral signals.

16. A ceilometer as defined in claim 14, furthermore including adjustable amplifier means amplifying the photodetector signal before application of the latter to the integrating means, and averaging means operative for ascertaining the average of the integral signals stored in the digital storage circuit means and in dependence upon the average automatically adjusting the adjustable amplifier means.

17. A ceilometer as defined in claim 16, the adjustable amplifier means being a controllable-gain amplifier means, the averaging means comprising means varying the gain of the controllable-gain amplifier means in inverse relationship to said average.

18. A ceilometer as defined in claim 16, the adjustable amplifier means being adjustable-threshold amplifier means, the averaging means comprising means increasing the threshold of the adjustable-threshold amplifier means with increasing values of said average and decreasing the threshold with decreasing values of said average.

19. A ceilometer as defined in claim 14, furthermore including means operative for ascertaining which of the stored integral signals has the largest value and generating a signal identifying the range step associated with such largest-value one of the integral signals.

20. A ceilometer as defined in claim 14, furthermore including a printer receiving signals indicative of range steps and associated integral signals and printing out values of range steps and values of associated integral signals, furthermore including means operative for transmitting to the printer signals indicative of those range steps whose integral signals have values in excess of a predetermined value and also signals indicating the values of those integral ignals whose values are in excess of the predetermined value.

21. A ceilometer as defined in claim 14, furthermore including digital-to-analog converter means, means applying to the latter integral signals read out from the digital storage circuit means, and a recorder receiving and displaying in analog form the values of the integral signals as a function of range step.

22. A ceilometer as defined in claim 21, the recorder being a recording oscilloscope.

23. The ceilometric method defined in claim 1, the photodetector being an avalanche diode, furthermore including the step of varying the voltage applied to and thereby the gain of the avalanche diode in dependence upon the ambient atmospheric conditions.

24. The ceilometric method defined in claim 1, the photodetector being an avalanche diode, furthermore including the step of varying the voltage applied to and thereby the gain of the avalanche diode such that the diode gain increase at least as a quadratic function of increasing range-step distance.

25. The ceilometric method defined in claim 1, furthermore including the step of storing the value of the largest integral signal developed during each exploration of said predetermined ceilometric range and during the next exploration of said ceilometric range applying the value of the largest integral signal developed during such next exploration of said ceilometric range to comparing means along with the value of the largest integral signal developed during the preceding exploration of said ceilometric range.

* * * * *